United States Patent
Kim et al.

(10) Patent No.: US 8,017,268 B2
(45) Date of Patent: Sep. 13, 2011

(54) LITHIUM SECONDARY BATTERY INCLUDING DISCHARGE UNIT

(75) Inventors: Hyun-Tak Kim, Daejeon (KR);
Doo-Hyeb Youn, Daejeon (KR);
Byung-Gyu Chae, Daejeon (KR);
Kwang-Yong Kang, Daejeon (KR);
Bong-Jun Kim, Daejeon (KR);
Yong-Wook Lee, Daejeon (KR);
Sun-Jin Yun, Daejeon (KR);
Jung-Wook Lim, Daejeon (KR);
Gyung-Ock Kim, Seoul (KR);
Sung-Lyul Maeng, Cheongjoo (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

(21) Appl. No.: 11/813,898

(22) PCT Filed: Jan. 12, 2006

(86) PCT No.: PCT/KR2006/000127
§ 371 (c)(1),
(2), (4) Date: Jul. 13, 2007

(87) PCT Pub. No.: WO2006/075878
PCT Pub. Date: Jul. 20, 2006

(65) Prior Publication Data
US 2009/0286140 A1     Nov. 19, 2009

(30) Foreign Application Priority Data

Jan. 14, 2005   (KR) .................. 10-2005-0003807
Jun. 8, 2005    (KR) .................. 10-2005-0048868

(51) Int. Cl.
*H01M 4/02* (2006.01)
*H01M 4/13* (2006.01)
(52) U.S. Cl. ........................................ 429/209
(58) Field of Classification Search .............. 429/209
See application file for complete search history.

(56) References Cited

U.S. PATENT DOCUMENTS
5,847,538 A * 12/1998 Yoshimatsu ............ 320/123
(Continued)

FOREIGN PATENT DOCUMENTS
JP      2001286067 A  * 10/2001

OTHER PUBLICATIONS

Andreev et al. "Resistivity of the Metallic Phase of Epitaxial VO2 Films," Pis'ma v. ZhETF, vol. 60, Iss. 9, pp. 637-638.*

(Continued)

*Primary Examiner* — Jennifer K. Michener
*Assistant Examiner* — Eli S Mekhlin
(74) *Attorney, Agent, or Firm* — Kile Park Coekjian Reed & McManus PLLC (57) ABSTRACT

Provided is a lithium secondary battery including a discharge unit capable of delaying or preventing a battery explosion. The lithium secondary battery includes a discharge unit disposed parallel to a battery body. The discharge unit includes a first electrode connected to a positive electrode of the battery body, a second electrode connected to a negative electrode of the battery body, and a discharge material film, disposed between the first electrode and the second electrode, inducing a abrupt discharge above a predetermined temperature. The discharge material film, e.g., a abrupt metal-insulator transition (MIT) material film can induce a abrupt discharge, thereby preventing or delaying a battery explosion.

15 Claims, 6 Drawing Sheets

U.S. PATENT DOCUMENTS

| | | | |
|---|---|---|---|
| 6,150,051 A * | 11/2000 | Du Pasquier et al. | 429/62 |
| 6,780,208 B2 * | 8/2004 | Hopkins et al. | 29/623.5 |
| 2001/0043138 A1 * | 11/2001 | Furuta et al. | 337/167 |
| 2004/0245582 A1 * | 12/2004 | Kim et al. | 257/394 |
| 2005/0260486 A1 * | 11/2005 | Cho et al. | 429/62 |

OTHER PUBLICATIONS

Seonghoon Jin et al., "Simulation of Quantum Effects and Nonlocal Transport by Using the Hydrodynamic Density-Gradient Model", Journal of the Korean Physical Society, vol. 44, No. 1, Jan. 2004, pp. 87-92.

Hyun-Tak Kim et al., "Mechanism and observation of Mott transition in VO2-based two- and three-terminal devices", New Journal of Physics, vol. 6 (52), May 17, 2004, pp. 1-19.

Office Action issued on Feb. 5, 2010 by the Chinese Patent Office in Chinese Patent Application No. 2006-80006485.9.

* cited by examiner

LITHIUM SECONDARY BATTERY INCLUDING DISCHARGE UNIT

TECHNICAL FIELD

The present invention relates to a lithium secondary battery, and more particularly, to a lithium secondary battery which delays or prevents an explosion phenomenon due to an anomalous rise in the internal temperature of the battery.

BACKGROUND ART

Lithium secondary batteries, e.g., lithium-ion secondary batteries have a high energy density per unit volume, and thus are used as power sources in various portable electronic devices such as notebook computers, camcorders, cameras, and personal digital assistants (PDAs), as well as cellular phones. However, if temperature of a battery in an overcharged or fully charged state rises, the battery can become swollen, there by resulting in explosion at about 150° C. Battery explosions can be accompanied by fire in some cases. Furthermore, when the skin of a consumer is exposed to a poisonous gas generated from batteries, skin irritation may be caused, and in serious cases, inflammation or breathing trouble may occur. Battery explosions are well known in the art. However, this phenomenon is caused by very abrupt temperature elevation, and thus, there is no reliable solution to prevent the risk of explosion.

Figure 1:
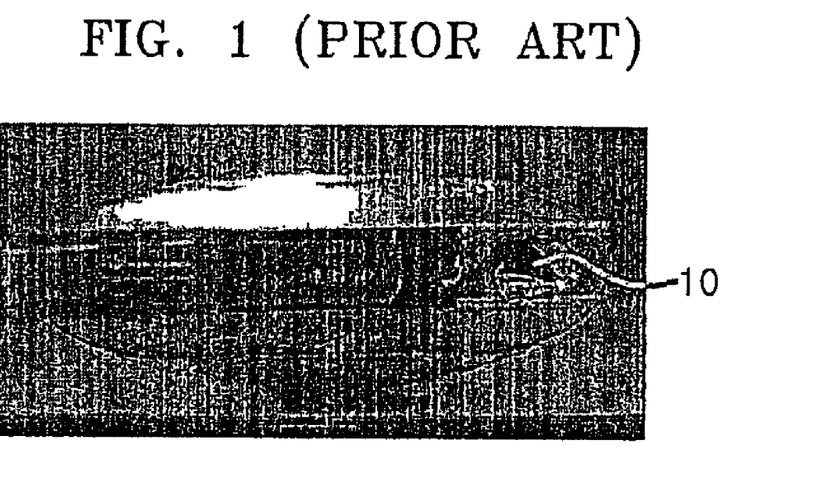
FIG. 1 is a photographic image of a conventional lithium-ion secondary battery which exploded at a temperature of about 150° C.

FIG. 1 is a photographic image of a conventional lithium-ion secondary battery which exploded at a temperature of about 150° C. A battery explosion takes place when gas within the battery is released from a safety vent. In FIG. 1, a deep hole 10 was formed around the safety vent of the battery. Just before an explosion, a battery is extremely swollen compared to the original size of the battery. That is, a battery explosion causes gas release from a safety vent when the internal pressure of the battery reaches a predetermined level at which the outer shell of the battery, extremely swollen by an increase of the internal pressure of the battery, cannot withstand the internal pressure.

Figure 2A:
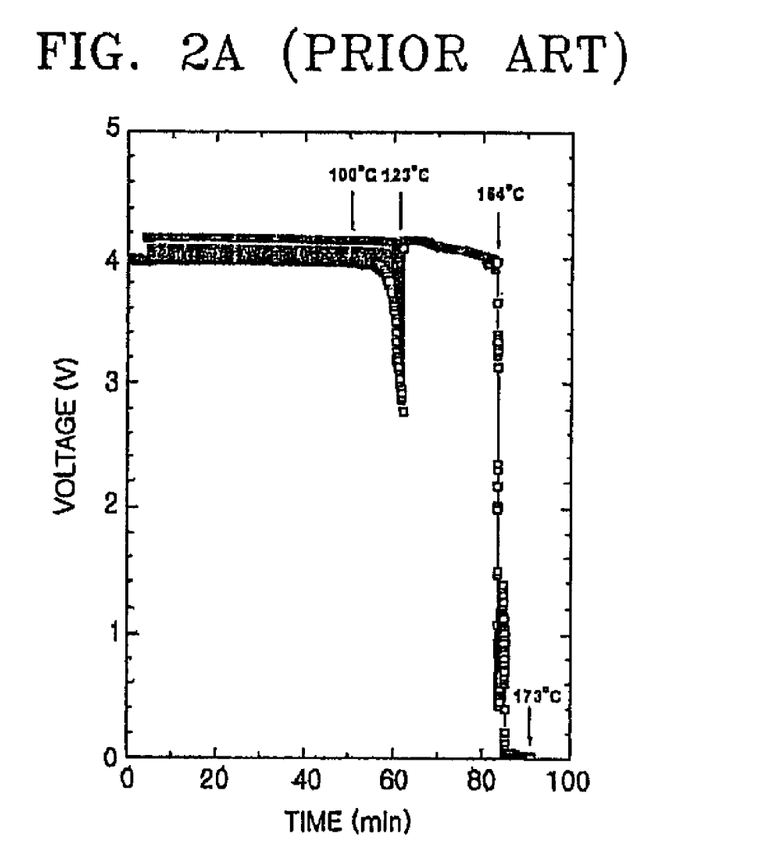
FIG. 2A is a graph illustrating voltage characteristics with respect to temperature and time in a conventional large-capacity battery.

FIG. 2A illustrates voltage characteristics with respect to time and temperature in a lithium-ion secondary battery used in cellular phones. The lithium-ion secondary battery has a standard charge voltage of 3.7 V, a full charge voltage of 4.2 V, and a charge current of 830 mAh (standard) and 1,900 mAh (large capacity).

Referring to FIG. 2A, as the temperature exceeded about 100° C., voltage was gradually lowered due to the internal breakdown of the battery. At about 123° C., a voltage for a power-down mode dropped abruptly, and a cellular phone did not work due to low current less than 100 mA, and thus a slight voltage increase was observed. At about 164° C., voltage was abruptly lowered. At about 173° C., a battery explosion occurred.

Due to the battery explosion, voltage was hardly observed at about 173° C.

As the internal temperature of the battery exceeded about 100° C., voltage was lowered by the internal change of the battery. At about 123° C., the cellular phone was disconnected from a wireless network and even turned off. At about 164° C., the voltage reached about 0 V. At about 173° C., an explosion occurred. That is, at about 90° C., a fully charged battery undergoes a large internal change, and thus, becomes so unstable that a stable power supply cannot be guaranteed. At a temperature greater than 90° C., the battery cannot be used any more because it has already run dead.

Figure 2B:
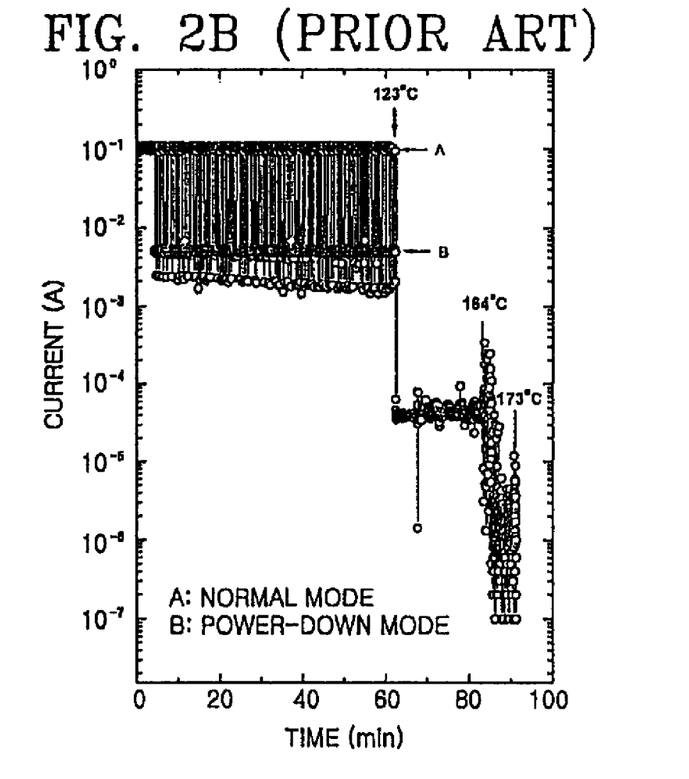
FIG. 2B is a graph illustrating current characteristics with respect to time and temperature in the same battery as used in FIG. 2A.

FIG. 2B is a graph illustrating current characteristics with respect to time and temperature in the same battery as used in FIG. 2A. Referring to FIG. 2B, until a temperature of about 123° C. was reached, the battery was normally operated during a power-down mode (5 mA) and a normal mode (100 mA). Above 123° C., battery characteristics became lowered. That is, at about 123° C., the power supply to the battery was stopped, and thus, only a small current of 13 µA flowed through the battery. At about 164° C., the current dropped to about zero. Until a temperature of 173° C. was reached, zero current was detected. At 173° C., a battery explosion occurred. At this time, a discharge amount was about 0.03%. That is, at about 123° C., the current dropped abruptly and the power supply to the battery was stopped. At about 173° C., a battery explosion occurred.

In view of the above-described battery explosion phenomenon, lithium-ion secondary batteries are provided with safety systems such as positive temperature coefficients (PTCs) on their insides and protection circuits on their outsides, to protect them from the risk of explosion or fire due to overcurrent, overdischarge, or overheating. The PTCs interrupt a current flow toward batteries when the temperature of the batteries rises to a predetermined level. At this time, the interrupting current is about 3 A or more. That is, overcurrent flows through the batteries until a current of about 3 A is reached. Also, as the temperature of the batteries increases, the batteries become unstable. The above-described safety systems work only in a temperature range of −20° C. to 60° C. in which cellular phones are normally used and operated. Thus, there is no safety apparatus capable of delaying or preventing the explosion of lithium secondary batteries exposed to high temperatures except a safety vent for releasing gas fully filled in the batteries.

DISCLOSURE OF THE INVENTION

The present invention provides a lithium secondary battery including a discharge unit capable of delaying or preventing a battery explosion.

According to an aspect of the present invention, there is provided a lithium secondary battery including: a battery body having a positive electrode and a negative electrode; and a discharge unit disposed parallel to the battery body. The discharge unit includes a first electrode connected to one of the positive electrode and the negative electrode of the battery body, a second electrode connected to the other of the positive electrode and the negative electrode of the battery body, and a discharge material film, disposed between the first electrode and the second electrode, inducing a abrupt discharge above a predetermined temperature.

The discharge material film may be a abrupt metal-insulator transition material film having a transition resistance difference ($\Delta R$) of $10^3$ to $10^5 \Omega$, and a metal-phase resistance of $500 \Omega$ or less. The abrupt metal-insulator transition material film may be made of at least one selected from (i) an insulator, and a p-type inorganic compound semiconductor with low hole concentration, including oxygen, a semiconductor element selected from Group III-V or II-VI compounds, a transition metal element, a rare earth element, and a lanthanum element, (ii) an insulator and a p-type organic compound semiconductor with low hole concentration; and (iii) an insulator, a p-type semiconductor with low hole concentration, and a p-type oxide semiconductor with low hole concentration. The abrupt metal-insulator transition material film may be a vanadium oxide (VOx) film. An insulator-to-metal transition temperature of the vanadium oxide (VOx) film may be about 68° C.

Each of the first electrode and the second electrode may be formed as a single layer or a multi-layer made of one selected from the group consisting of Mo, W, Al, Ni/Mo/Au, Cr/Au, Ni/Au, W/Au, Ti/Au/, Mo/Au, Ru/Au, and Ir/Au. A distance between the first electrode and the second electrode may be 3 to 100 μm.

The first electrode and the second electrode may be separated from each other by a predetermined distance such that their opposing ends are parallel to each other. When viewed from above, each of the first electrode and the second electrode may have a comb-like structure with a plurality of recesses and protrusions so that the first electrode is engaged with the second electrode.

Each of the first electrode and the second electrode may be comprised of a plurality of sub-electrodes having the same shape, and the sub-electrodes of each of the first electrode and the second electrode may be connected in parallel. Each of the sub-electrodes connected in parallel may have a resistance of about 1.0 to 2.0Ω.

According to another aspect of the present invention, there is provided a lithium secondary battery including: a battery body having a positive electrode and a negative electrode; a battery protection circuit disposed parallel to the battery body; a positive temperature coefficient (PTC) disposed in series between the positive electrode of the battery body and the battery protection circuit; and a discharge unit disposed parallel to the battery body. The discharge unit includes a first electrode connected to one of the positive electrode and the negative electrode of the battery body, a second electrode connected to the other of the positive electrode and the negative electrode of the battery body, and a discharge material film, disposed between the first electrode and the second electrode, inducing a abrupt discharge above a predetermined temperature.

BEST MODE FOR CARRYING OUT THE INVENTION

The present invention will be described more fully hereinafter with reference to the accompanying drawings in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

A discharge unit of a lithium secondary battery of the present invention may include a abrupt metal-insulator transition (MIT) material film. The abrupt MIT material film may have a transition resistance difference ($\Delta R$) of $10^3$ to $10^5 \Omega$ and a metal-phase resistance of 500Ω or less. The abrupt MIT material film may be made of at least one selected from (i) an insulator, and a p-type inorganic compound semiconductor with low hole concentration, including oxygen, a semiconductor element selected from Group III-V or II-VI compounds, a transition metal element, a rare earth element, and a lanthanum element, (ii) an insulator and a p-type organic compound semiconductor with low hole concentration; and (iii) an insulator, a p-type semiconductor with low hole concentration, and a p-type oxide semiconductor with low hole concentration.

In exemplary embodiments of the present invention, the abrupt MIT material film is a vanadium oxide (VOx) film. Vanadium oxide film and device fabrication techniques are disclosed in *Korean Phys. Soc.* Vol. 4 4, p 88 and *New J. Phys.* Vol. 6, p 52, (2004). In lithium secondary batteries according to embodiments of the present invention, a abrupt discharge is induced at a predetermined temperature at which explosion does not occur. For example, when the abrupt MIT material film is a vanadium oxide (VOx) film, a abrupt discharge is induced at about 68° C. That is, when a lithium secondary battery reaches about 68° C., it is abruptly discharged in a short time. Furthermore, the lithium secondary batteries according to the embodiments of the present invention include a abrupt MIT material film having low resistance characteristics so that high current can flow after metal-insulator transition, and electrodes resistant to high current. As used herein, the phrase "explosion is delayed or prevented" conveys the meaning that battery swelling is prevented. Thus, an object of the present invention is to provide a lithium secondary battery capable of preventing or delaying battery explosion and preventing battery swelling.

First Embodiment

Figure 3A:
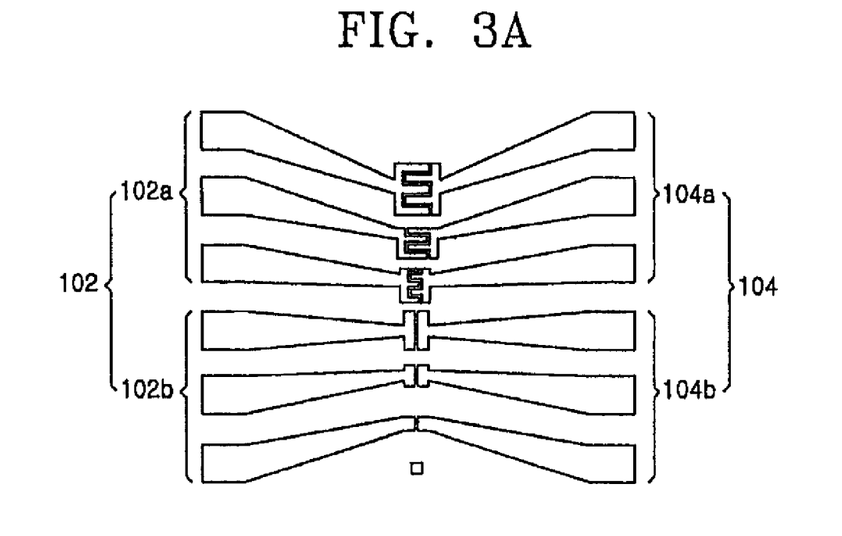
FIG. 3A is a plan view illustrating exemplary electrode patterns for first and second electrodes of a discharge unit according to a first embodiment of the present invention.

FIG. 3A is a plan view illustrating exemplary electrode patterns that can be used as a first electrode 102 and a second electrode 104 of a discharge unit according to a first embodiment of the present invention.

Referring to FIG. 3A, the first electrode 102 and the second electrode 104 may be respectively formed as one of first electrode patterns 102a and its corresponding one of second electrode patterns 104a or as one of first electrode patterns 102b and its corresponding one of second electrode patterns 104b. One ends of the first electrode patterns 102a and the opposite ends of the second electrode patterns 104a may be undulating. The first electrode patterns 102b and the second electrode patterns 104b may be separated from each other by a predetermined distance such that their opposing ends are parallel to each other. In detail, when viewed from above, each of the first electrode patterns 102a and the second electrode patterns 104a may have a comb-like structure with a plurality of recesses and protrusions so that each first electrode pattern 102a is engaged with its corresponding second electrode pattern 104a. As such, when one ends of the first electrode patterns 102a overlap with the opposite ends of the second electrode patterns 104a, a contact surface area between the first and second electrode patterns 102a and 104a and a abrupt MIT material film (see 204 of FIG. 3B) increases, thereby decreasing electric resistance. At this time, the first electrode patterns 102a are engaged with the second electrode patterns 104a so that there is a predetermined space between the first electrode patterns 102a and the second electrode patterns 104a. Meanwhile, the resistance of each of the first electrode patterns 102a and 102b may be the same as that of each corresponding one of the second electrode patterns 104a and 104b.

Figure 3B:
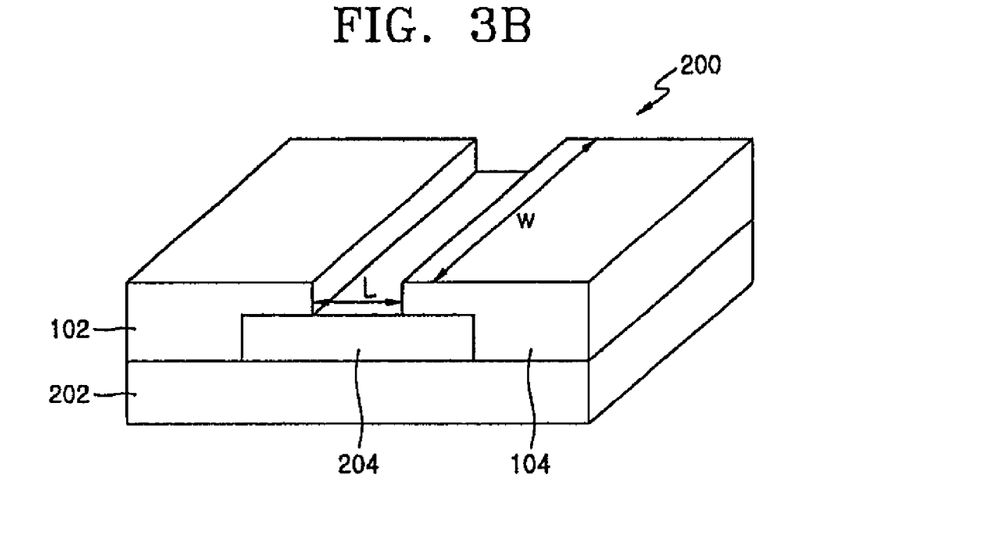
FIG. 3B is a schematic perspective view illustrating a discharge unit including a abrupt metal-insulator transition (MIT) material film.

FIG. 3B is a schematic perspective view illustrating a discharge unit 200 including a abrupt MIT material film 204 with metal-insulator transition characteristics. Here, for convenience of illustration, FIG. 3B illustrates one of the electrode patterns 102b and one of the electrode patterns 104b of FIG. 3A as a first electrode 102 and a second electrode 104, respectively.

Referring to FIG. 3B, the discharge unit 200 includes the abrupt MIT material film 204, e.g., a vanadium oxide film, having a predetermined width on a substrate 202, and the first and second electrodes 102 and 104 covering the substrate 202 and both upper sides of the abrupt MIT material film 204 so that an upper center portion of the abrupt MIT material film 204 is exposed. That is, the abrupt MIT material film 204 is disposed between the first electrode 102 and the second electrode 104. For example, the substrate 202 may be made of silicon or sapphire. Here, L represents a distance between the first electrode 102 and the second electrode 104, and W represents a width of each of the first electrode 102 and the second electrode 104. L may be 3 to 50 μm and W may be 10 to 2,500 μm. A distance between an upper surface of the abrupt MIT material film 204 and an upper surface of the first electrode 102 or the second electrode 104 may be 900 to 3,000 Å. The first and second electrodes 102 and 104 may be formed as a single layer or a multi-layer made of Mo, W, Al, Ni/Mo/Au, Cr/Au, Ni/Au, W/Au, Ti/Au/, Mo/Au, Ru/Au, or Ir/Au. The first and second electrodes 102 and 104 may be formed by sputtering, evaporation, vacuum evaporation, or E-beam evaporation.

When a battery including the discharge unit 200 is discharged, current with very high current density of $10^6$ A/cm$^2$ or more flows. Thus, heat may be generated at a contact area between the abrupt MIT material film 204 and the first and second electrodes 102 and 104, thereby causing damage to the abrupt MIT material film 204, the first electrode 102, or the second electrode 104. However, when using the first and second electrodes 102 and 104, the abrupt MIT material film 204 and the first and second electrodes 102 and 104 were not damaged under abrupt discharge conditions as follows: battery voltage of 4.2V, current of about 1 A, temperature of 150° C., time of 20 hours.

Figure 3C:
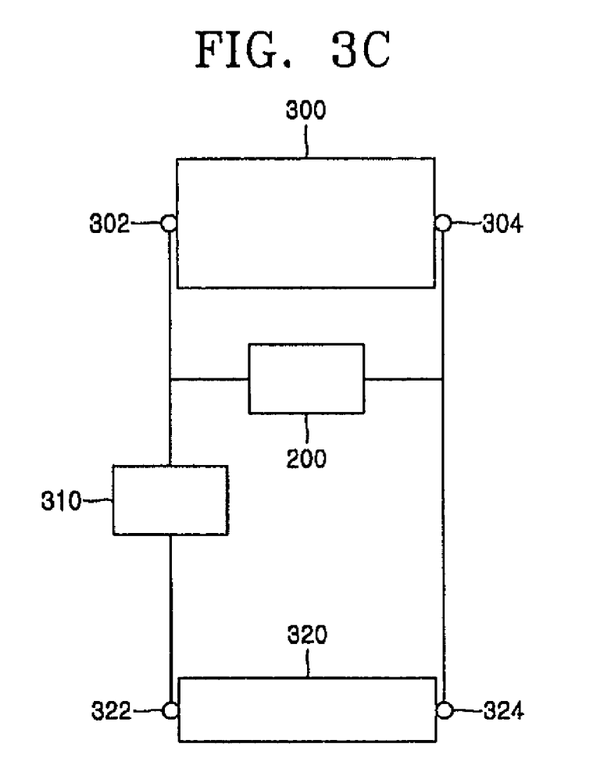
FIG. 3C is a circuit view of a battery in which a positive temperature coefficient (PTC) device is connected to the discharge unit of FIG. 3B.

Meanwhile, most commercially available lithium-ion secondary batteries are provided with a PTC device as an overcurrent protection device. In this regard, to induce a abrupt discharge at high temperature using an MIT material film, a circuit view of a battery in which a PTC device is connected to a discharge unit is illustrated in FIG. 3C. Referring to FIG. 3C, a first electrode (see 102 of FIG. 3B) or a second electrode (see 104 of FIG. 3B) of a discharge unit 200 is connected to a positive lead line 302 or a negative lead line 304 of a battery body 300 and a PTC device 310. The first electrode and the second electrode of the discharge unit 200 are correspondingly parallel-connected to the positive lead line 302 and the negative lead line 304, and thus, the discharge unit 200 can induce a discharge regardless of the operation of the PTC device 310. If the first electrode 102 of the discharge unit 200 is connected between the PTC device 310 and a first terminal 322 of a protection circuit 320, and the second electrode 104 of the discharge unit 200 is parallel-connected to the negative lead line 304 of the battery body 300, a abrupt discharge may be interrupted by the PTC device 310. Thus, it is preferable that the discharge unit 200 and the PTC device 310 are respectively connected to a second terminal 324 and the first terminal 322 of the protection circuit 320. At this time, the discharge unit 200 is attached to a surface or inside of the battery body 300 to quickly respond to a temperature change of the battery body 300.

Figure 4A:
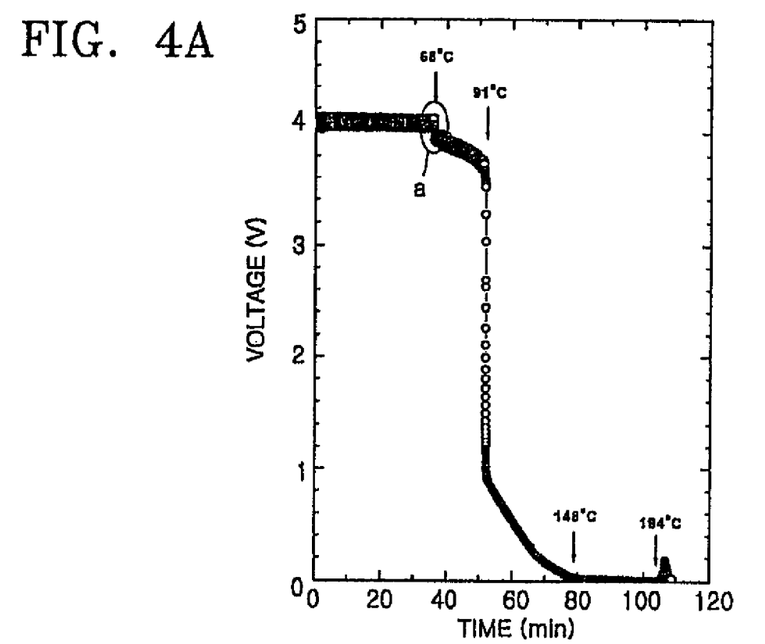
FIG. 4A is a graph illustrating voltage characteristics with respect to time and temperature in a battery including a discharge unit.
Figure 4B:
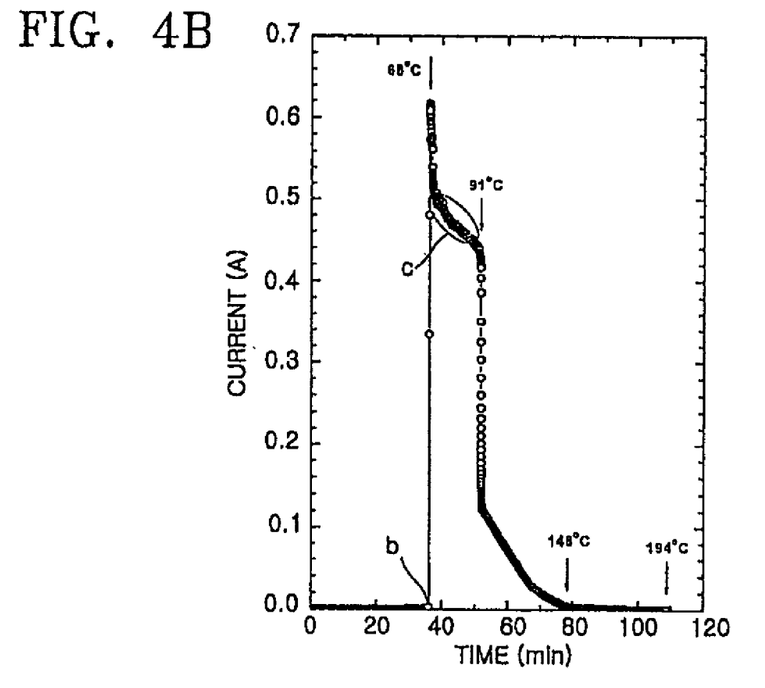
FIG. 4B is a graph illustrating current characteristics with respect to time and temperature using the same battery as in FIG. 4A.

FIG. 4A illustrates a time and temperature dependency of a charge voltage of a battery provided with the discharge unit 200 including a pair of first and second electrodes. In detail, FIG. 4A illustrates voltage characteristics with respect to time and temperature in a lithium secondary battery including the discharge unit 200 inducing a abrupt discharge at about 68° C. and having a metal-phase resistance of about 4Ω. FIG. 4B illustrates current characteristics with respect to time and temperature under the same conditions as in FIG. 4A. At this time, the same battery as illustrated in FIGS. 2A and 2B was used.

Referring to FIG. 4A, the charge voltage was maintained at about 4.2 V until a temperature of about 68° C. was reached. At about 68° C., the charge voltage dropped to 4.0V due to abrupt metal-insulator transition (part a). Then, the charge voltage gradually dropped to about 3.7 V until a temperature of about 91° C. was reached. The charge voltage dropped abruptly when the temperature reached about 91° C., and then reached almost 0 V at about 148° C. At about 194° C., an explosion occurred. That is, the explosion temperature of the battery including the discharge unit 200 was about 14° C. higher than that (about 173° C.) of a battery including no discharge unit 200 (see FIG. 2A). That is, the charge voltage dropped slightly due to metal-insulator transition at about 68° C., and the cellular phone was turned off due to a abrupt voltage drop at about 91° C. At about 148° C., the charge voltage was almost 0 V. At about 194° C., an explosion occurred.

Referring to FIG. 4B, at about 68° C., the charge current increased from 1 mA to 0.6 A due to abrupt metal-insulator transition (part b). At about 91° C., the charge current dropped to 0.4 A. A discharge occurred in a temperature range of 68 to 91° C. for about 16 minutes (part c). At about 91° C., the charge current dropped abruptly. At about 148° C., the charge current reached almost 0 A. At about 194° C., an explosion occurred. At this time, a discharge amount was about 5%. That is, the charge current was greatly increased due to metal-insulator transition at about 68° C. Until about 91° C., high current discharge occurred. At about 91° C., the charge current dropped abruptly. At about 148° C., the charge current reached almost 0 A, and at about 194° C., an explosion occurred.

Second Embodiment

Figure 5A:
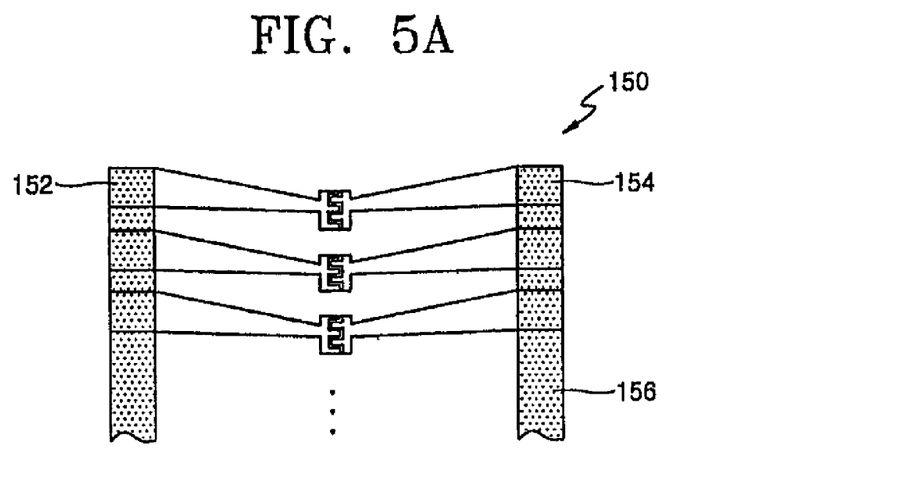
FIG. 5A is a plan view illustrating an exemplary electrode pattern for first and second electrodes of a discharge unit according to a second embodiment of the present invention.
Figure 5B:
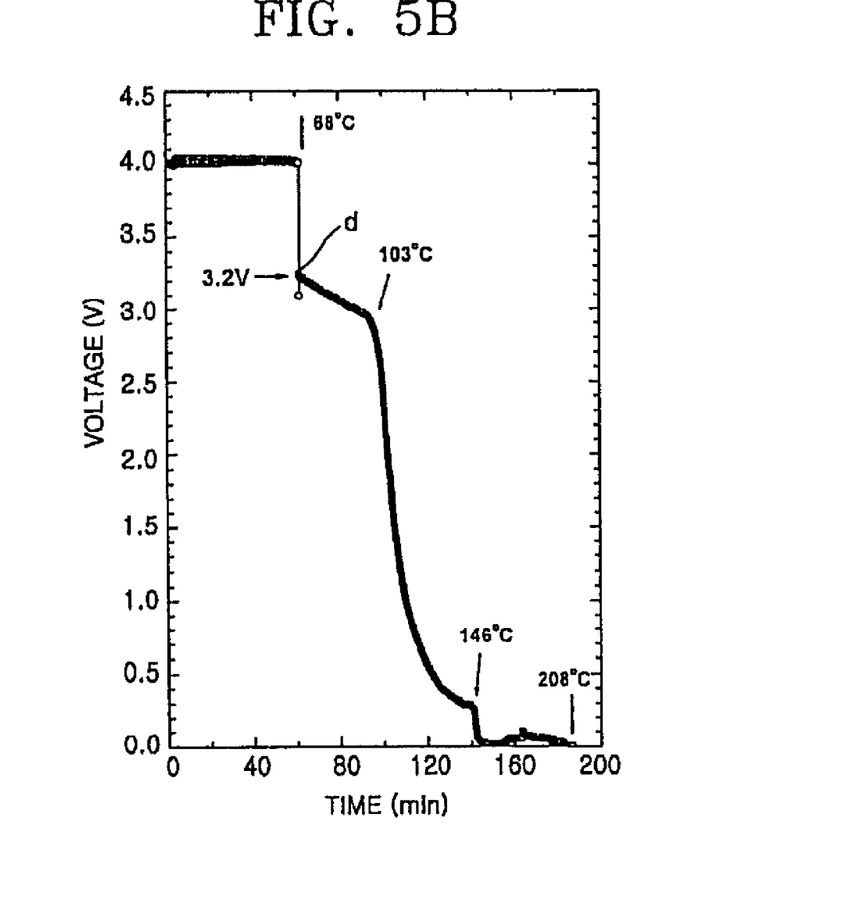
FIG. 5B is a graph illustrating voltage characteristics with respect to time and temperature in a large-capacity battery including a discharge unit manufactured using the electrode pattern of FIG. 5A.
Figure 5C:
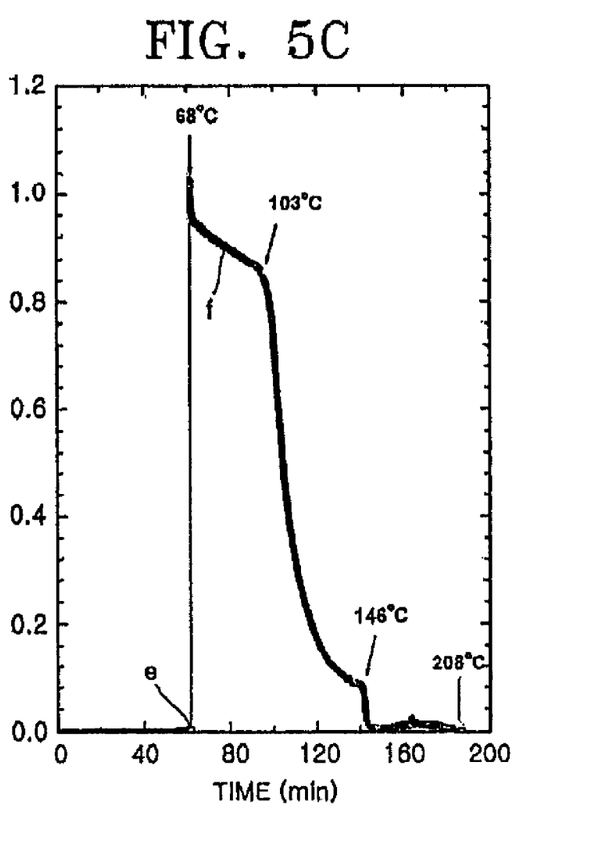
FIG. 5C is a graph illustrating current characteristics with respect to time and temperature using the same battery as in FIG. 5 B.

FIG. 5A is a plan view illustrating an exemplary electrode pattern 150 for first and second electrodes of a discharge unit according to a second embodiment of the present invention, FIG. 5B is a graph illustrating voltage characteristics with respect to time and temperature in a large-capacity battery including a discharge unit using the electrode pattern of FIG. 5A, and FIG. 5C is a graph illustrating current characteristics with respect to time and temperature under the same conditions as in FIG. 5B. The discharge unit of the current embodiment of the present invention has the same structure as that of the embodiment shown in FIG. 3B except first and second electrodes.

Referring to FIG. 5A, the electrode pattern 150 is structured such that first electrodes 152 are connected in parallel and second electrodes 154 are connected in parallel by a conductive line 156. The discharge unit including the first electrodes 152 and the second electrodes 154 can have a resistance of 1.0 to 2.0Ω, preferably 1.33Ω, which is lower than that of a discharge unit including a pair of electrodes according to the first embodiment. Thus, the discharge unit of the current embodiment can induce higher current discharge than that of the first embodiment for the same time, which makes a battery more stable.

Referring to FIG. 5B, a relatively large voltage drop (from 4.2 V to 3.2 V) was observed at about 68° C. due to low resistance characteristics of the parallel-connected first and second electrodes 152 and 154 (part d). Until about 103° C., the charge voltage dropped gradually from 3.2V to 2.9V. At about 146° C., the charge voltage reached almost 0V. However, until a temperature of about 208° C. was reached, no explosion was observed. That is, the discharge unit of the current embodiment exhibits very low resistance characteristics when a MIT material film is in a metal phase. At about 68° C., the charge voltage dropped greatly from about 4.1 V to about 3.2 V due to metal-insulator transition. Like in the first embodiment, as the temperature increased further, the charge voltage dropped abruptly (at about 103° C.). However, even when the temperature reached about 208° C., no battery explosion was observed.

Figure 6:
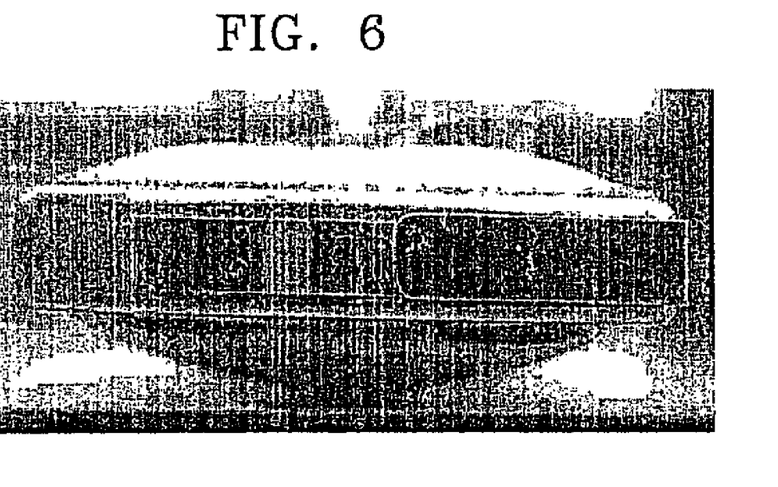
FIG. 6 is a photographic image showing that a lithium secondary battery including the discharge unit according to the second embodiment of the present invention has not exploded even at about 208° C.

Referring to FIG. 5C, the charge current was increased to about 1 A at a transition temperature (part e). Until about 103° C., the charge current dropped to about 0.8 A due to a discharge for about 30 minutes (part f). Until about 146° C., the charge current dropped more abruptly. However, until a temperature of about 208° C. was reached, the battery became swollen slightly but an explosion caused by the release of internal gas did not occur (see FIG. 6).

That is, the discharge unit of the current embodiment of the present invention is a composite device in which the first electrodes 152 are connected in parallel and the second electrodes 154 are connected in parallel, and has very low resistance characteristics when its MIT material film is in a metal phase. At about 68° C., the charge current was greatly increased due to metal-insulator transition. Until about 103° C., discharge occurred. Above 103° C., the charge current dropped greatly.

No occurrence of battery explosion in the current embodiment of the present invention can be explained by a discharge amount of about 13.5% which is greater than the discharge amount (5%) shown in FIG. 4B according to the first embodiment. Battery charge is a stacking behavior of Li ions of a $LiCoO_2$ cathode onto a graphite anode. Li ions are stable in $LiCoO_2$. Thus, when a discharge occurs, a battery is maintained at a more stable state. In this state, even when the temperature increases, the battery does not swell greatly.

INDUSTRIAL APPLICABILITY

As described above, a discharge unit of a lithium secondary battery according to the present invention includes a abrupt MIT material film, and thus abruptly discharges charges charged in the lithium secondary battery. Therefore, a battery explosion can be prevented or delayed. Furthermore, even when a temperature increases, battery swelling can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lithium secondary battery comprising:
   a battery body having a positive electrode and a negative electrode; and
   a discharge unit connected in parallel with the positive and negative electrodes, the discharge unit comprising:
      a first electrode connected to one of the positive electrode and the negative electrode of the battery body;
      a second electrode connected to the other of the positive electrode and the negative electrode of the battery body; and
      a discharge material film, connected between the first electrode and the second electrode, inducing a abrupt discharge above a predetermined temperature,
      wherein the first and second electrodes have comb-like structures with a plurality of recesses and protrusions such that the first electrode is engaged with the second electrode, and wherein the comb-like structures of the first and second electrodes cover a portion of the discharge material film,
      wherein the discharge material film is a abrupt metal-insulator transition material film having a transition resistance difference (ΔR) of $10^3$ to $10^5 Ω$, and a metal-phase resistance of 500Ω or less.

2. The lithium secondary battery of claim 1, wherein the abrupt metal-insulator transition material film is made of at least one selected from (i) an insulator, and a p-type inorganic compound semiconductor with low hole concentration, comprising oxygen, a semiconductor element selected from Group III-V or II-VI compounds, a transition metal element, a rare earth element, and a lanthanum element, (ii) an insulator and a p-type organic compound semiconductor with low hole concentration; and (iii) an insulator, a p-type semiconductor with low hole concentration, and a p-type oxide semiconductor with low hole concentration.

3. The lithium secondary battery of claim 1, wherein the abrupt metal-insulator transition material film is a vanadium oxide (VOx) film.

4. The lithium secondary battery of claim 3, wherein an insulator-to-metal transition temperature of the vanadium oxide (VOx) film is about 68° C.

5. The lithium secondary battery of claim 1, wherein each of the first electrode and the second electrode is formed as a single layer or a multi-layer made of one selected from the group consisting of Mo, W, Al, Ni/Mo/Au, Cr/Au, Ni/Au, W/Au, Ti/Au/, Mo/Au, Ru/Au, and Ir/Au.

6. The lithium secondary battery of claim 1, wherein a distance between the first electrode and the second electrode is 3 to 100 μm.

7. The lithium secondary battery of claim 1, wherein the first electrode and the second electrode are separated from each other by a predetermined distance such that their opposing ends are parallel to each other.

8. The lithium secondary battery of claim 1, wherein when viewed from above, each of the first electrode and the second electrode has a comb-like structure with a plurality of recesses and protrusions so that the first electrode is engaged with the second electrode.

9. The lithium secondary battery of claim 1, wherein each of the first electrode and the second electrode is comprised of a plurality of sub-electrodes having the same shape, and the sub-electrodes of each of the first electrode and the second electrode are connected in parallel.

10. The lithium secondary battery of claim 9, wherein each of the sub-electrodes connected in parallel has a resistance of about 1.0 to 2.0Ω.

11. A lithium secondary battery comprising:
a battery body having a positive electrode and a negative electrode;
a battery protection circuit having first and second terminals such that the second terminal is connected to the negative electrode of the battery body;
a positive temperature coefficient (PTC) device connected in series between the positive electrode of the battery body and the first terminal of the battery protection circuit; and
a discharge unit connected in parallel to the battery body, the discharge unit comprising:
a first electrode connected to one of the positive electrode and the negative electrode of the battery body;
a second electrode connected to the other of the positive electrode and the negative electrode of the battery body; and
a discharge material film, connected between the first electrode and the second electrode, inducing a abrupt discharge above a predetermined temperature,
wherein the discharge material film is a abrupt metal-insulator transition material film having a transition resistance difference ($\Delta R$) of $10^3$ to $10^5 \Omega$, and a metal-phase resistance of 500Ω or less.

12. The lithium secondary battery of claim 11, wherein the abrupt metal-insulator transition material film is made of at least one selected from (i) an insulator, and a p-type inorganic compound semiconductor with low hole concentration, comprising oxygen, a semiconductor element selected from Group III-V or II-VI compounds, a transition metal element, a rare earth element, and a lanthanum element, (ii) an insulator and a p-type organic compound semiconductor with low hole concentration; and (iii) an insulator, a p-type semiconductor with low hole concentration, and a p-type oxide semiconductor with low hole concentration.

13. The lithium secondary battery of claim 11, wherein the first electrode and the second electrode are separated from each other by a predetermined distance such that their opposing ends are parallel to each other.

14. The lithium secondary battery of claim 11, wherein when viewed from above, each of the first electrode and the second electrode has a comb-like structure with a plurality of recesses and protrusions so that the first electrode is engaged with the second electrode.

15. A lithium secondary battery comprising:
a battery body having a positive electrode and a negative electrode;
a battery protection circuit having first and second terminals such that the second terminal is connected to the negative electrode of the battery body;
a positive temperature coefficient (PTC) device disposed in series between the positive electrode of the battery body and the first terminal of the battery protection circuit; and
a discharge unit disposed parallel to the battery body, the discharge unit comprising:
a first electrode connected to one of the positive electrode and the negative electrode of the battery body;
a second electrode connected to the other of the positive electrode and the negative electrode of the battery body; and
a discharge material film, connected between the first electrode and the second electrode, inducing a abrupt discharge above a predetermined temperature,
wherein the first and second electrodes have comb-like structures with a plurality of recesses and protrusions such that the first electrode is engaged with the second electrode, and wherein the comb-like structures of the first and second electrodes cover a portion of the discharge material film, and
wherein the discharge material film is a abrupt metal-insulator transition material film having a transition resistance difference ($\Delta R$) of $10^3$ to $10^5 \Omega$, and a metal-phase resistance of 500Ω or less.

* * * * *